C. JÖRGENSEN & A. HAAHR.

EDGE SETTING IRON.

APPLICATION FILED OCT. 8, 1909.

Reissued Aug. 15, 1911. 13,284.

WITNESSES:
Elizabeth C. Coupe
Edith C. Holbrook

INVENTORS.
Christian Jörgensen
Anton Haahr
By their Attorney
Nelson Morehead

UNITED STATES PATENT OFFICE.

CHRISTIAN JÖRGENSEN AND ANTON HAAHR, OF COPENHAGEN, DENMARK, ASSIGNORS, BY MESNE ASSIGNMENTS, TO UNITED SHOE MACHINERY COMPANY, OF PATERSON, NEW JERSEY, A CORPORATION OF NEW JERSEY.

EDGE-SETTING IRON.

13,284. Specification of Reissued Letters Patent. Reissued Aug. 15, 1911.

Original No. 894,152, dated July 21, 1908, Serial No. 329,923. Application for reissue filed October 8, 1909. Serial No. 521,772.

*To all whom it may concern.*

Be it known that we, CHRISTIAN JÖRGENSEN, of Kronborggade No. 13, Copenhagen, in the Kingdom of Denmark, mechanical engineer, and ANTON HAAHR, of H. P. Larsens Sidevej No. 5, Copenhagen, in the Kingdom of Denmark, mechanical engineer, both citizens of the Kingdom of Denmark, have invented new and useful Improvements in Edge-Setting Irons, of which the following is a specification.

The object of the present invention is to provide an improved edge setting iron with impression wheel. Tools of this kind are used in the boot and shoe manufacturing trade for the purpose of polishing or burnishing the edge of the sole and simultaneously producing on footwear that is not welted an imitation of the stitch separating effect that may frequently be seen on welt boots and shoes. Such tools may also be used to produce on footwear a fair stitch imitation; or to produce on welt shoes an appearance similar to that made by the stitch separating tool. In tools of the said kind hitherto used the axle of the impression-wheel is fixed firmly in the tool, and the operator can only in a very deficient manner and by exerting a pressure on the tool adjust the depth of the impression. This drawback is obviated through the present invention by arranging the axle of the impression-wheel so as to be capable of being adjusted in the tool, thereby rendering it possible to make lighter or deeper impressions into the rand or welt, according to circumstances.

Figure 1:
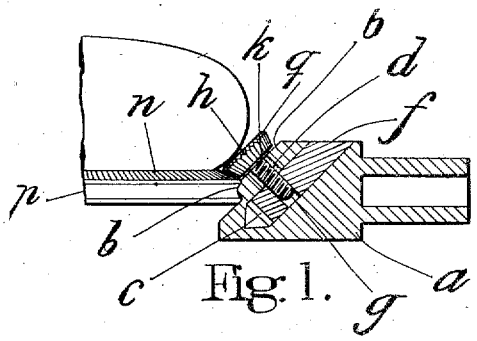
Figure 2:
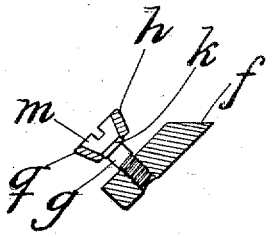

The invention is illustrated on the accompanying drawing, in which:

Figure 1 shows a longitudinal section of the edge setting iron, and Fig. 2 a detail.

*a* designates an edge-setting iron, adapted to be fixed to an edge setting machine, and having a smooth face *b* of suitable form for burnishing the edge *p* of the shoe sole. A bearing surface *b'* formed on the iron slopes backward from the burnishing face at substantially right angles to the upper beveled face *n* of the shoe sole. Behind said face and parallel thereto is formed a bore *c* connected with the face *b'* through a short slot *d* running parallel to the bore. A slide *f* mounted within the bore carries a screw *g* which projects through the slot *d*, said screw having a conical head *m* on which is rotatably mounted an impression wheel *h*.

By moving the slide *f* in the bore the wheel may be adjusted with relation to the burnishing surface *b* for the purpose of increasing or diminishing the depth of the impressions made by the wheel *h*. The wheel may be held in its adjusted position by a collar *k* formed on the screw and when the latter is screwed into the slide the collar, which extends over the slot, rests on the face *b'* and locks the slide in place. The outer edge of the wheel *h* is preferably beveled as at *q* to prevent its teeth from coming into contact with the upper of the shoe.

Before starting operation the slide *f* is adjusted in the bore, in such position that the teeth of the impression wheel will lie at a suitable distance from the surface *b*, and the screw is then turned to firmly lock the slide. The edge setting iron can now be used in the usual manner. In the iron illustrated, the plane in which the impression-wheel rotates is at right angles with the sloping edge *n* of the projecting shoe sole so that the impression has the same depth at the outer edge of the sole as it has near the upper.

The adjustment of the impression-wheel does not affect its relation with the upper so that a careless adjustment can not in any way damage the upper. This is a very important feature as it is necessary in other irons of this class to cover the impression-wheel with a shield to prevent the warm wheel from touching the upper and thereby damaging the same. A shield not being necessary in the tool forming the subject of this invention, the impression-wheel can be operated in closer proximity to the upper than heretofore and thus the indentations can be applied closer to the upper.

Having described our invention what we claim as new and desire to secure by Letters Patent of the United States is:—

1. The combination with an edge setting iron, of a rotatable indenting tool, said tool being constructed and arranged to operate on the upper surface of the projecting portion of a shoe sole simultaneously with the operation of the iron on the sole edge, and said tool being arranged for adjustment relative to the edge setting iron in a direction substantially perpendicular to the surface on which the tool operates.

2. The combination with an edge setting iron having a burnishing face, of a rotatable indenting tool arranged to operate on the upper surface of the projecting portion of a shoe-sole, and means guided in the body portion of said iron whereby the position of said tool relative to said burnishing face may be adjusted.

3. The combination with an edge setting iron, of an indenting tool constructed and arranged to operate on the upper surface of the projecting portion of a shoe sole, and means, including a slide guided in the body portion of said iron, whereby said tool may be adjusted toward or from the surface on which it operates.

4. The combination of an edge setting iron having a guideway formed therein, an adjustable slide located in said guideway, a spindle carried by said slide and a stitch impression tool mounted on said spindle.

5. The combination with an edge setting iron having two slots in its body portion extending at an angle to each other, an adjustable slide received in one of said slots, a spindle carried by the slide and projecting through the other slot, and a rotatable indenting tool positioned on the spindle.

6. The combination of an edge setting iron provided with a slot inclined backwardly with relation to the bottom surface of the iron, a slide received in said slot, means for holding said slide in an adjusted position and a stitch impression wheel carried by said slide.

7. An edge setting iron having a fixed burnishing face, an inclined bearing surface above said face, and a bore parallel to said surface and connected therewith by a slot, a slide in the bore, a screw carried by said slide projecting through and adapted to move longitudinally of the slot and having a collar formed thereon to engage the bearing surface and lock the screw in position, and a wheel on the screw having a toothed periphery to engage the upper face of a shoe sole.

8. The combination of an edge-setting iron provided with a slot inclined backward in relation to the bottom surface of the iron, a sliding piece provided in the said slot, means for keeping the said sliding piece in position, and a stitch-wheel journaled in the said sliding piece, substantially as and for the purpose set forth.

In testimony whereof we have signed our names to the specification in the presence of two subscribing witnesses.

CHRISTIAN JÖRGENSEN.
ANTON HAAHR.

Witnesses:
ERNST ENNA,
HY. HÅKANSSON.